United States Patent
Toki et al.

[11] Patent Number: 6,163,108
[45] Date of Patent: Dec. 19, 2000

[54] FLUORESCENT LUMINOUS DEVICE

[75] Inventors: Hitoshi Toki; Shigeo Itoh, both of Mobara, Japan

[73] Assignee: Futaba Denshi Kogyo K.K., Chiba-ken, Japan

[21] Appl. No.: 09/118,090

[22] Filed: Jul. 17, 1998

[30] Foreign Application Priority Data

Jul. 18, 1997 [JP] Japan ................................. 9-194071

[51] Int. Cl.[7] ...................................................... H01J 1/62

[52] U.S. Cl. ............................................................ 313/496

[58] Field of Search ................................. 313/496, 463, 313/467, 486, 487, 495

[56] References Cited

U.S. PATENT DOCUMENTS

| | | | |
|---|---|---|---|
| 4,100,454 | 7/1978 | Hase et al. | 313/495 |
| 5,041,458 | 8/1991 | Huiskes et al. | 313/487 |

*Primary Examiner*—Ashok Patel
*Attorney, Agent, or Firm*—Breiner & Breiner

[57] ABSTRACT

A fluorescent luminous device capable of providing a fluorescent luminous device including a non-sulfide phosphor which is reduced in resistance and emits light of a reddish luminous color. The fluorescent luminous device is so constructed that the phosphor layer is made of a non-sulfide phosphor excited by luminescence of a ZnO:Zn phosphor to emit light of a yellowish red luminous color. The ZnO:Zn phosphor is deposited on the non-sulfide phosphor.

11 Claims, 5 Drawing Sheets

FLUORESCENT LUMINOUS DEVICE

BACKGROUND OF THE INVENTION

This invention relates to a fluorescent luminous device, and more particularly to a fluorescent luminous device including a phosphor which prevents such a deterioration in cathode as caused by a sulfide phosphor and exhibits an increased emission spectrum and improved luminance characteristics.

In the art, there have been conventionally known a field emission display (FED) and a vacuum fluorescent display (VFD) as a fluorescent luminous device. A fluorescent luminous device for monochromatic display generally has a ZnO:Zn phosphor incorporated therein. The ZnO:Zn phosphor exhibits highly increased luminescence under a low voltage while ensuring increased reliability, however, it fails to emit light of a red luminous color because a luminous color thereof is bluish green. Multi-coloration of display in a conventional fluorescent luminous device is carried out by either using filters of various colors or coating an anode with various phosphors different in luminous color.

Techniques of arranging a filter on the ZnO:Zn phosphor to provide luminescence of various luminous colors cause a reduction in luminance of a reddish luminous color, to thereby fail to put the fluorescent luminous device to practical use. In view of such a disadvantage, it is proposed to add a phosphor of a reddish orange luminous color such as $ZnCdS:Ag,Cl$, $Y_2O_2S:Eu$ or the like to the ZnO:Zn phosphor to permit the ZnO:Zn phosphor to exhibit a reddish luminous color as well, resulting in a reddish luminous color close to white which has a wide spectrum range being provided. Also, additional techniques of employing a phosphor of a white luminous color used in a cathode ray tube (CRT) are proposed.

Unfortunately, a phosphor obtained by adding such an additional phosphor as described above to the ZnO:Zn phosphor is varied in voltage dependency of luminance depending on a type of the phosphor added, leading to color shift wherein a luminous color is varied due to a variation in drive voltage. Also, the phosphor added to the ZnO:Zn phosphor is deteriorated in life characteristics as compared with the ZnO:Zn phosphor, leading to shift of chromaticity during lighting operation of the fluorescent luminous device. Further, the ZnCdS:Ag phosphor exhibits satisfactory luminance characteristics, however, it causes scattering of a sulfur ingredient during lighting operation of the device, to thereby deteriorate cathodes. Moreover, the phosphor for the CRT is inherently decreased in luminance and deteriorated in life characteristics.

Currently, in order to obtain luminous colors different from that of the ZnO:Zn phosphor by means of only one kind of phosphor, a sulfide phosphor is put to practical use. However, the sulfide phosphor causes decomposition and scattering thereof due to impingement of electrons thereon, leading to pollution of cathodes and therefore a deterioration thereof.

Scattering of a sulfur ingredient contained in the sulfur phosphor deteriorates both emission characteristics and life characteristics of filamentary cathodes. This affects field emission cathodes of an FED more seriously than the filamentary cathodes.

More specifically, an FED includes a cathode substrate formed on an inner surface thereof with field emission cathodes. The field emission cathodes each include a cathode conductor formed on the cathode substrate, an insulating layer formed on the cathode conductor, a gate electrode formed on the insulating layer, holes each formed in the gate electrode and insulating layer so as to commonly extend through the gate electrode and insulating layer, and emitters of a conical shape each arranged in each of the holes while being positioned on the cathode conductor. The FED also includes a light-permeable anode substrate arranged opposite to the field emission cathodes on the cathode substrate while being spaced from the cathode substrate at a microdistance. The anode substrate is formed on an inner surface thereof with anodes. The anodes each include a light-permeable anode conductor and a phosphor layer deposited on the anode conductor. The cathode substrate and anode substrate are sealedly joined at an outer periphery thereof to each other by means of a seal material. In the FED thus constructed, application of a voltage of a suitable level to the cathode conductor and gate electrode permits electrons to be emitted from a distal end of the emitters, which are then impinged on the anode, leading to luminescence of the phosphor layer on the anode. Luminescence of the anode is then observed through the light-permeable anode conductor and anode substrate.

Field emission of the FED is based on an electron field-emitting phenomenon, resulting in being affected by a variation in work function due to adsorption of gas and fine particles on the field emission cathode. For example, adhesion of oxygen and sulfide gas to the distal end of the conical emitter increases a work function because an interval between the distal end of the emitter and the gate is microfine. Also, the field emission cathode and anode each are formed into a flat shape of a predetermined area and an interval therebetween is set to be as fine as, for example, 200 $\mu$m, to thereby be highly susceptible to gas emitted from the anode. Further, gas emitted from the anode and sulfide gas adhered to the field emission cathode may possibly cause short-circuiting between the anode and the field emission cathode, leading to breakage of the anode and field emission cathode, resulting in emission characteristics being fully deteriorated. Thus, it will be noted that the field emission cathode is highly adversely affected by decomposition and scattering of the sulfide phosphor as compared with the filamentary cathode.

In view of the foregoing, the assignee proposed such a phosphor layer formed by lamination as shown in FIG. 10. This is disclosed in Japanese Patent Application Laid-Open Publication No. 55592/1996 (Japanese Patent Application No. 190590/1994). More particularly, the phosphor layer is formed by laminating a ZnO:Zn phosphor layer element 103 on a sulfide phosphor layer element 102 deposited on an anode conductor 101 formed on an anode substrate 100. Unfortunately, such an arrangement as shown in FIG. 10 causes the sulfide phosphor to be decomposed by a slight amount of electrons reaching the sulfide phosphor 102 through particles of the ZnO:Zn phosphor 103 as indicated at arrows in FIG. 10, leading to scattering of the sulfide phosphor. Thus, the arrangement fails to provide complete solution to the problem.

As described above, the techniques intended to obtain a desired luminous wavelength by mixing of the ZnO:Zn phosphor with any additional phosphor which were proposed in view of the fact that the ZnO:Zn phosphor lacks a luminous component of a red color fail to exhibit desired reliability due to a difference in life and luminance characteristics between the phosphors. Also, the sulfide phosphor currently used causes a deterioration in cathode. In particular, the field emission cathode (FEC) is critically damaged due to pollution by decomposition of the sulfide phosphor. Further, a phosphor increased in resistance is not suitable for use in the fluorescent luminous device because it causes anode voltage drop. Under such situations, it would be highly desirable to provide a fluorescent luminous device including a non-sulfide phosphor which is reduced in resistance and emits light of a reddish luminous color.

SUMMARY OF THE INVENTION

The present invention has been made in view of the foregoing disadvantage of the prior art.

Accordingly, it is an object of the present invention to provide a fluorescent luminous device which is capable of providing a fluorescent luminous device having a non-sulfide phosphor incorporated therein which is reduced in resistance and emits light of a reddish luminous color.

In accordance with the present invention, a fluorescent luminous device is provided. The fluorescent luminous device includes an anode substrate made of a light-permeable material so as to constitute a part of an envelope, electrodes made of a light-permeable material and formed on an inner surface of the anode substrate, a non-sulfide phosphor formed on each of the electrodes, and a ZnO:Zn phosphor deposited on the non-sulfide phosphor. The non-sulfide phosphor is excited by luminescence of the ZnO:Zn phosphor to emit light of a yellowish red luminous color. The fluorescent luminous device also includes an electron source arranged in the envelope.

In a preferred embodiment of the present invention, the non-sulfide phosphor contains a non-sulfide conductive material exhibiting light-permeability.

In a preferred embodiment of the present invention, the conductive material is arranged so as to cover the non-sulfide phosphor in a film-like manner.

In a preferred embodiment of the present invention, the conductive material is added to the non-sulfide phosphor.

In a preferred embodiment of the present invention, the conductive material is at least one selected from the group consisting of ZnO, $In_2O_3$ and $SnO_2$.

In a preferred embodiment of the present invention, the non-sulfide phosphor is $(Y_{1-x}, Gd_x)_3Al_5O_{12}$:Ce (X=0.4 to 0.9).

In a preferred embodiment of the present invention, the non-sulfide phosphor is 3.5 MgO.0.5 $MgF_2/GeO_2$:Mn.

In a preferred embodiment of the present invention, the ZnO:Zn phosphor has an average particle diameter of 0.4 or less supposing that an average particle diameter of the non-sulfide phosphor is 1.

In a preferred embodiment of the present invention, the non-sulfide phosphor has an average particle diameter of 6 $\mu$m and the ZnO:Zn phosphor has an average particle diameter of 1 $\mu$m or less.

In a preferred embodiment of the present invention, the non-sulfide phosphor emits light of a yellowish red luminous color having a wavelength between 550 nm and 700 nm.

In a preferred embodiment of the present invention, the electron source is constituted by field emission cathodes.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a fluorescent luminous device according to the present invention will be described hereinafter with reference to FIGS. 1 to 9.

In general, it is known in the art that excitation of a phosphor by electron beams in a vacuum causes the phosphor to be deteriorated in luminous characteristics and life characteristics due to heat generated therefrom by irradiation of electron beams thereon, whereas excitation thereof by light beams does not cause such a deterioration. The present invention has been made by utilizing a ZnO:Zn phosphor increased in luminance characteristics and life characteristics and combining a phosphor emitting light of a yellowish red luminous color by excitation thereof due to luminescence of the ZnO:Zn phosphor with the ZnO:Zn phosphor while taking notice of the above-described fact, resulting in providing a fluorescent luminous device which includes a phosphor layer exhibiting a white luminous color.

The phosphor to be combined with the ZnO:Zn phosphor desirably has an excitation region contained in a luminous region of the ZnO:Zn phosphor and preferably has an excitation region defined between 400 nm and 550 nm. In particular, it desirably has an excitation region defined between 550 nm and 700 nm. More specifically, the phosphors include $(Y_{1-x}, Gd_x)_3Al_5O_{12}$:Ce, 3.5 MgO.0.5 $MgF_2.GeO_2$:Mn and the like.

Figure 1:
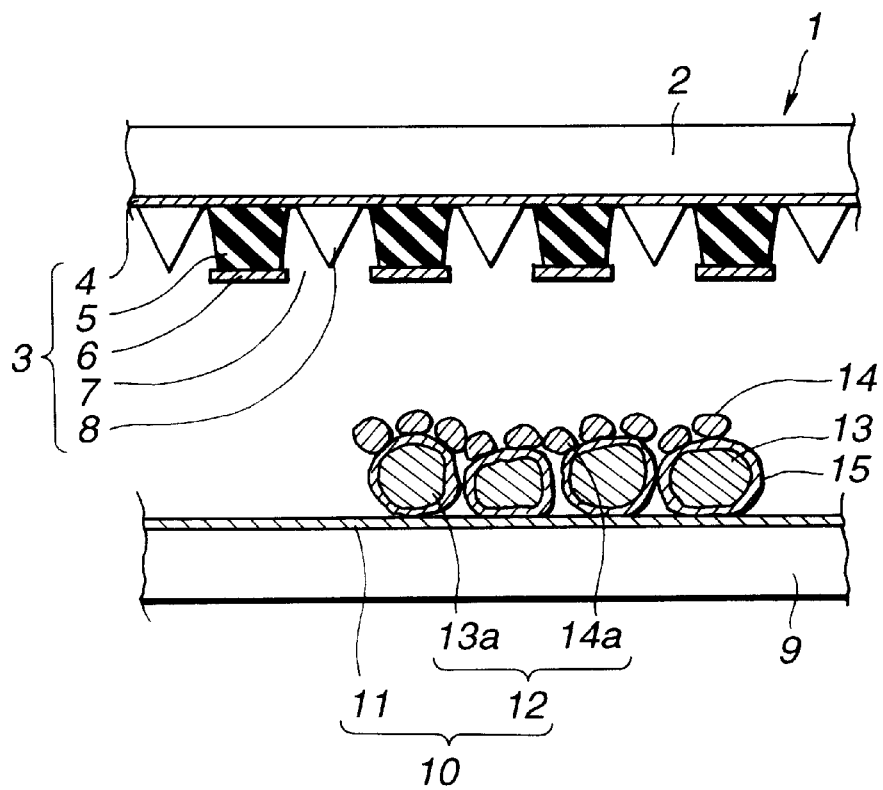
FIG. 1 is a fragmentary schematic sectional view showing a first embodiment of a fluorescent luminous device according to the present invention.

Referring first to FIG. 1, an embodiment of a fluorescent luminous device according to the present invention in which such a phosphor layer as described above are incorporated. A fluorescent luminous device of the illustrated embodiment generally designated at reference numeral 1 is constructed into a field emission display (FED) and includes a cathode substrate 2 on which field emission cathodes 3 are formed. The field emission cathodes 3 each include a cathode conductor 4 arranged on the cathode substrate 2, an insulating layer 5 formed on the cathode conductor 4, a gate electrode 6 formed on the insulating layer 5, holes 7 formed in the gate electrode 6 and insulating layer 5 so as to extend commonly through both gate electrode and layer 5, and emitters 8 of a conical shape each formed on a portion of the cathode conductor 4 exposed in each of the holes 7 while being arranged in the hole 7. The fluorescent display device 1 also includes a light-permeable anode substrate 9 arranged so as to be spaced from the cathode substrate 2 at a micro-interval while being opposite to the cathode substrate 2. The anode substrate 9 is formed on an inner surface thereof with anodes 10 in a manner to face the field emission cathodes 3. The anodes 10 each include a light-permeable anode conductor 11 made of indium tin oxide (ITO) or the like and a phosphor layer 12 deposited on the anode conductor 11. The cathode substrate 2 and anode substrate 9 thus arranged are sealedly joined at an outer periphery thereof to each other by means of a seal material (not shown).

In the fluorescent luminous device thus constructed, application of a voltage of a suitable level to each of the cathode conductor and gate electrode 6 permits electrons to be emitted from a distal end of the emitters 8 and then impinge on the anode 10, resulting in the phosphor layer 12 being excited for luminescence. The luminescence is then observed through the anode conductor 11 and anode substrate 9.

Now, the phosphor layer 12 formed on each of the anode conductors 11 arranged on the anode substrate 9 will be described As shown in FIG. 1, a non-sulfide phosphor 13 is deposited on the anode conductor 11 to form a first phosphor layer element 13a thereon. The non-sulfide phosphor 13 has an excitation region contained in a luminous region of the ZnO:Zn phosphor and is adapted to emit light of a red luminous color when it is excited by luminescence of the ZnO:Zn phosphor. Then, a ZnO:Zn phosphor 14 is laminatedly deposited on the non-sulfide phosphor layer 13, to thereby form a second phosphor layer element 14a on the first phosphor layer element 13a.

In this instance, in order to prevent the electrons from traveling to the first phosphor layer element 13a to cause decomposition and scattering of the non-sulfide phosphor 13, it is required that the phosphor layer elements 13a and 14a each exhibit electrical conductivity or the whole phosphor layer 2 of the two-layer structure exhibits electrical conductivity. The ZnO:Zn phosphor 14 is conductive, whereas $(Y_{1-x}, Gd_x)_3Al_5O_{12}$:Ce which may be used as the non-sulfide phosphor 13 is non-conductive. Thus, when the non-sulfide phosphor 13 is made of a non-conductive material such as $(Y_{1-x}, Gd_x)_3Al_5O_{12}$:Ce or the like, it is required to provide it with conductivity. More specifically, for this purpose, it may be carried out to coat the non-conductive non-sulfide phosphor with a conductive non-sulfide film which exhibits transparency in a visible region or incorporate a conductive non-sulfide material in the non-sulfide phosphor 13. For example, coating of the non-sulfide phosphor 13 with a conductive film 15 as shown in FIG. 1 prevents electrons passing through the phosphor layer element 14a formed of the ZnO:Zn phosphor 14 from impinging directly on the non-sulfide phosphor 13. Also, the conductive film 15 permits light emitted from the ZnO:Zn phosphor to pass or permeate therethrough, so that the non-sulfide phosphor 13 may be excited by only luminescence of the ZnO:Zn phosphor 14, to thereby possibly exhibit increased reliability. Such conductive materials include ZnO, $In_2O_3$, $SnO_2$ and the like.

Now, the present invention will be further described with reference to the following four examples. Of the examples, Examples 1 and 2 are directed to the first embodiment described above with reference to FIG. 1, and Examples 3 and 4 are directed to second and third embodiments of the present invention described hereinafter, respectively.

EXAMPLE 1

$(Y_{1-x}, Gd_x)_3Al_5O_{12}$:Ce (X=0.6) was used for the non-sulfide phosphor 13 for the first phosphor layer element 13a. In the example, alkoxide which is liquid-like organic metal was deposited on a surface of the non-sulfide phosphor 13, followed by calcination of the phosphor at a temperature of about 500° C., resulting in the non-sulfide phosphor 13 of which the surface is coated with $In_2O_3$ being provided. The amount of $In_2O_3$ coated is not limited to any specific range so long as it permits the non-sulfide phosphor to exhibit required conductivity. In the example, the amount of $In_2O_3$ was about 2%.

Figure 2:
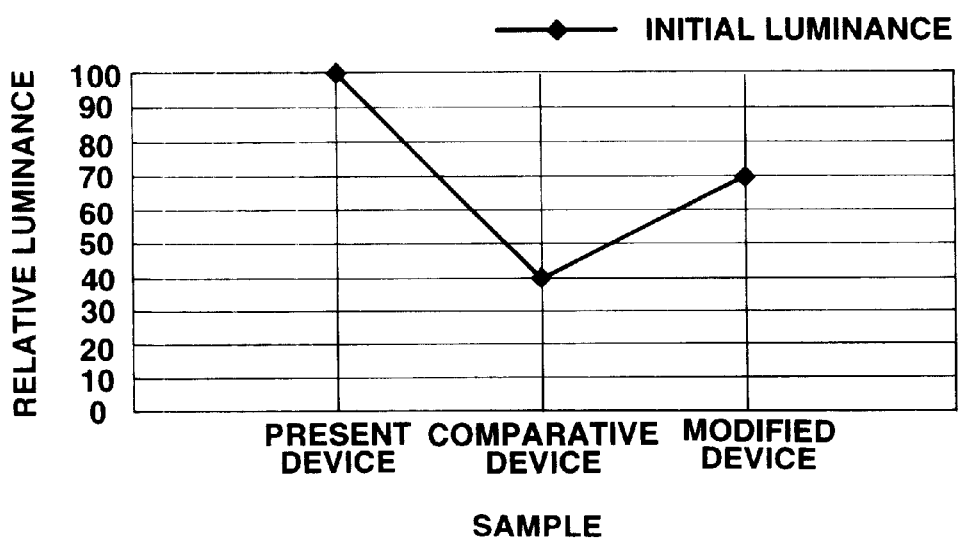
FIG. 2 is a graphical representation showing relative luminance of each of the fluorescent luminous device of the first embodiment shown in FIG. 1, a modification of the first embodiment and a fluorescent luminous device for comparison.
Figure 3:
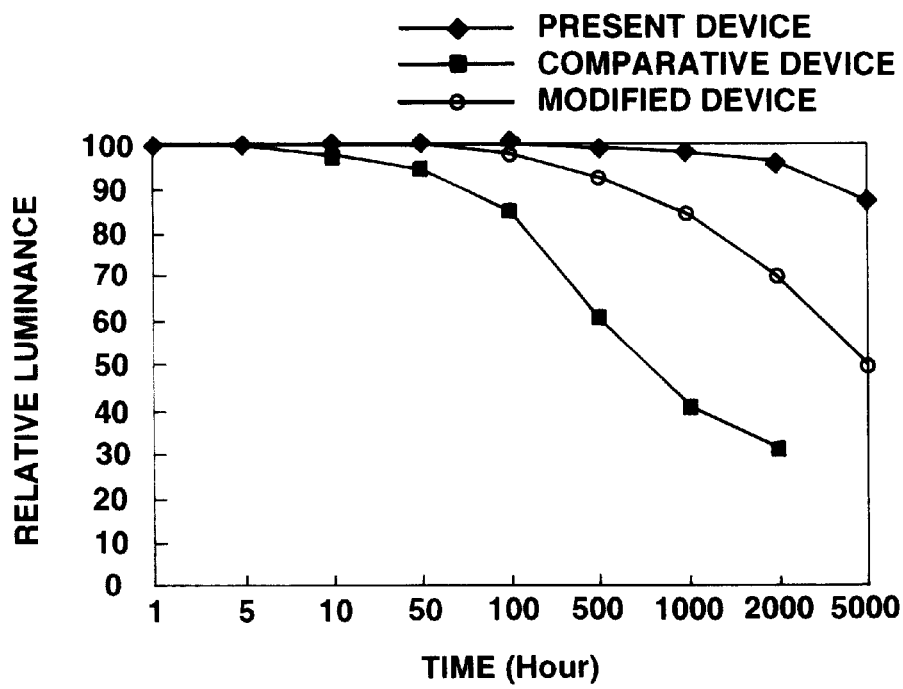
FIG. 3 is a graphical representation showing relationship between continuous lighting time and a decrease in relative luminance in each of the fluorescent luminous device of the first embodiment shown in FIG. 1, a modification of the first embodiment and a fluorescent luminous device for comparison.

The non-sulfide phosphor 13 was coated on the anode conductor (ITO electrode) 11 of the anode substrate 9 so as to have a thickness corresponding to a combined height of two phosphor particles, followed by drying of the phosphor 13. Then, the ZnO:Zn phosphor 14 was coated on the non-sulfide phosphor 13 in a like manner. Then, the phosphors 13 and 14 were subject to calcination in an ambient atmosphere at a temperature of 500° C., resulting in the anode substrate 9 being coated thereon with two phosphor layers. The anode substrate 9 was rendered opposite to the cathode substrate 2 formed thereon with the field emission cathodes 3 while being spaced therefrom at a predetermined interval, to thereby provide such a vacuum envelope as described above, leading to the fluorescent luminous device of the illustrated embodiment (hereinafter referred to as "present device"). Substantially the same procedure was repeated using the non-sulfide phosphor free of such an $In_2O_3$ coating as described above, to thereby provide a modification of the fluorescent luminous device of the illustrated embodiment (hereinafter referred to as "modified device"). The modified device was included in the scope of the present invention. Also, substantially the same procedure was repeated using a phosphor obtained by mixing the non-sulfide phosphor and ZnO:Zn phosphor with each other at a ratio of 1:1, to provide a fluorescent luminous device for comparison (hereinafter referred to as "comparative device"). FIG. 2 shows initial luminance (relative luminance) of each of the thus-obtained devices which was measured through a filter of a red color. FIG. 3 shows life characteristics of each of the devices.

As shown in FIG. 2, supposing that the present device is 100 in relative initial luminance, the modified device and comparative device were exhibited relative initial luminances of 70 and 40, respectively. It would be considered that the reason why the modified device was somewhat reduced in initial luminance as compared with the present device is that an anode voltage is dropped due to the phosphor layer of the non-sulfide phosphor free of any conductive film.

Also, the present device, as shown in FIG. 3, restricted an decrease in relative luminance after lapse of lighting time of 5000 hours to a level as low as only about 10%, to thereby exhibit excellent life characteristics. The modified device caused relative luminance thereof after lapse of 5000 hours to decreased to a level of about 50% which corresponds to a general limit of life characteristics of a fluorescent luminous device. This means that the modified device exhibited satisfactory life characteristics, although it was inferior to the present device. On the contrary, the comparative device caused the relative luminance to be reduced to a level below 50% in a period of time as short as 1000 hours, resulting in failing to exhibit practical life characteristics.

Further, the comparative device caused chromaticity thereof after the life test to be shifted to a side of the ZnO:Zn phosphor. This would be due to a deterioration in $(Y_{1-x}, Gd_x)_3Al_5O_{12}$:Ce by irradiation of electron beams thereon.

Figure 4:
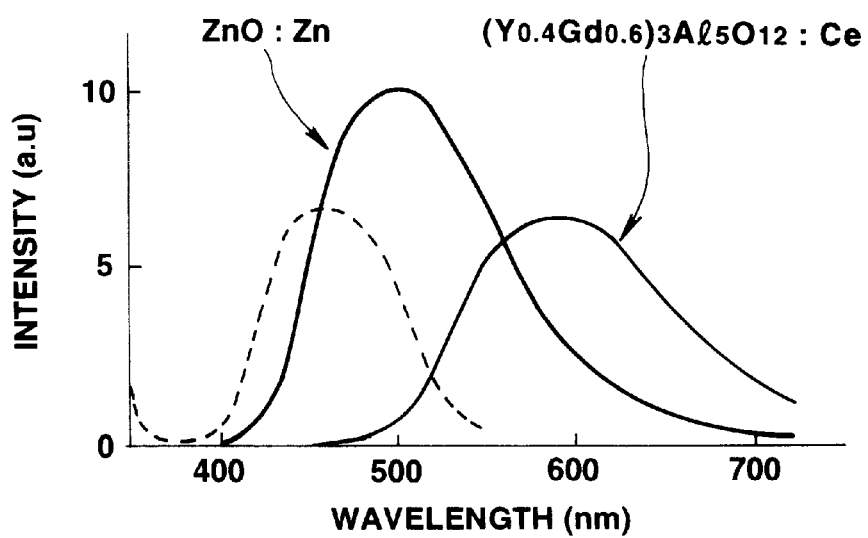
FIG. 4 is a graphical representation showing an emission spectrum of a ZnO:Zn phosphor, an excitation curve indicating an excitation region of a $(Y_{1-x}, Gd_x)_3Al_5O_{12}$:Ce phosphor, and an emission spectrum of the $(Y_{1-x}, Gd_x)_3Al_5O_{12}$:Ce phosphor.

FIG. 4 shows an emission spectrum of the ZnO:Zn phosphor, an excitation curve indicating an excitation region of the $(Y_{1-x}, Gd_x)_3Al_5O_{12}$:Ce phosphor and a luminous spectrum of the $(Y_{1-x}, Gd_x)_3Al_5O_{12}$:Ce phosphor. The excitation curve of the $(Y_{1-x}, Gd_x)_3Al_5O_{12}$:Ce phosphor substantially overlaps with the emission spectrum of the ZnO:Zn phosphor, so that the $(Y_{1-x}, Gd_x)_3Al_5O_{12}$:Ce phosphor may be effectively excited by luminescence of the ZnO:Zn phosphor, leading to luminescence.

Figure 5:
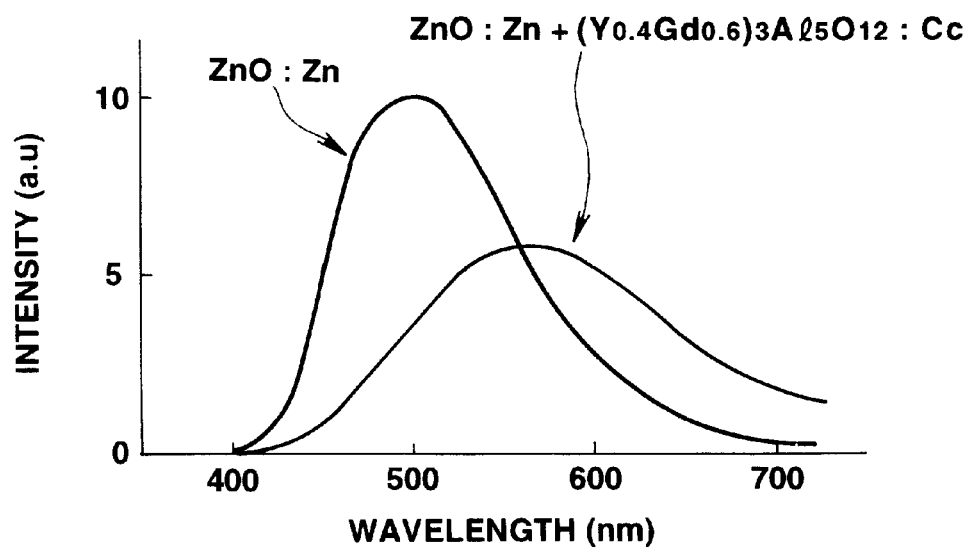
FIG. 5 is a graphical representation showing an emission spectrum of a ZnO:Zn phosphor and an emission spectrum of a phosphor layer formed by laminating a ZnO:Zn phosphor on a $(Y_{1-x}, Gd_x)_3Al_5O_{12}$:Ce phosphor in the first embodiment shown in FIG. 1.

FIG. 5 shows both an emission spectrum of the ZnO:Zn phosphor and that of the phosphor layer of the present device formed by laminating the ZnO:Zn phosphor on the $(Y_{1-x}, Gd_x)_3Al_5O_{12}$:Ce phosphor. As noted from FIG. 5, the phosphor layer of the present device exhibited an emission spectrum wherein a luminous component of a red color is supplemented to the luminous component of the ZnO:Zn phosphor. Also, in the present device, a ratio between a luminous component based on the ZnO:Zn phosphor and that based on the $(Y_{1-x}, Gd_x)_3Al_5O_{12}$:Ce phosphor may be controlled by a film thickness of each of the ZnO:Zn phosphor and $(Y_{1-x}, Gd_x)_3Al_5O_{12}$:Ce phosphor.

The $(Y_{1-x}, Gd_x)_3Al_5O_{12}$:Ce phosphor incorporated in the present device has been described in the case of X=0.6. The present invention is not limited to such a value of X. The $(Y_{1-x}, Gd_x)_3Al_5O_{12}$:Ce phosphor effectively supplements a red luminous component to the luminous component of the ZnO:Zn phosphor within a range of X between 0.4 and 0.9.

EXAMPLE 2

Figure 6:
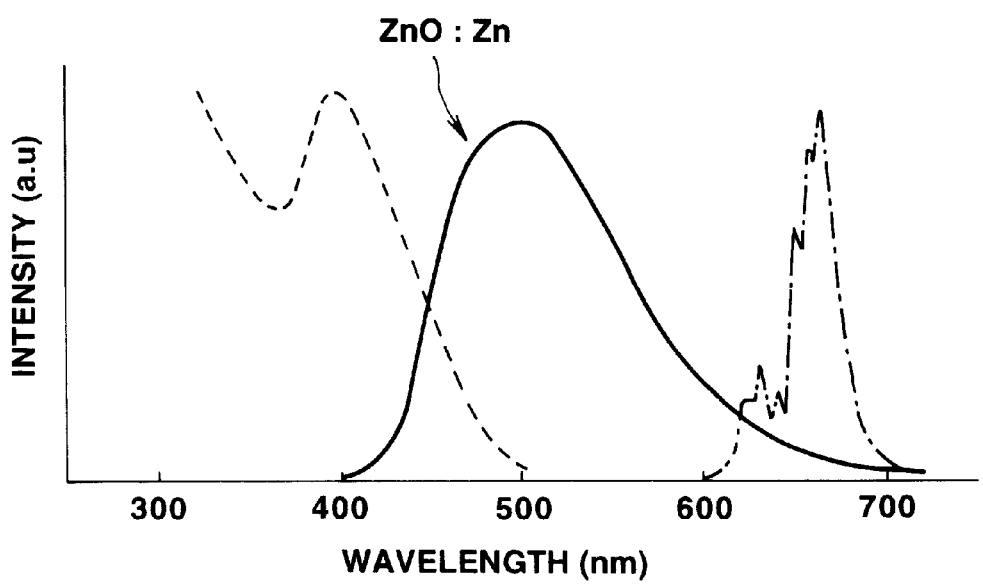
FIG. 6 is a graphical representation showing an emission spectrum of a ZnO:Zn phosphor, an excitation curve indicating an excitation region of a 3.5 MgO.0.5 $MgF_2.GeO_2$:Mn phosphor.

Example 1 described above was substantially repeated on the fluorescent luminous device of FIG. 1, except that a 3.5 MgO.0.5 MgF$_2$/GeO$_2$:Mn phosphor was used as the non-sulfide phosphor for the first phosphor layer element. FIG. 6 shows an emission spectrum of the ZnO:Zn phosphor, an excitation curve indicating an excitation region of the 3.5 MgO.0.5 MgF$_2$/GeO$_2$:Mn phosphor and an emission spectrum of the 3.5 MgO.0.5 MgF$_2$/GeO$_2$:Mn phosphor. In the example, luminescence of the 3.5 MgO.0.5 MgF$_2$/GeO$_2$:Mn phosphor supplemented a red luminous component (600 to 700 nm) to the luminous component of the ZnO:Zn phosphor.

The example was evaluated as in Example 1 described above. Supposing that initial luminance of the present device is 100, those of the comparative device and modified device were about 50 and about 60, respectively. Also, the present device did not cause a decrease in luminance and a variation in chromaticity even after it was driven for a period of time as long as 2000 hours.

EXAMPLE 3

Figure 7:
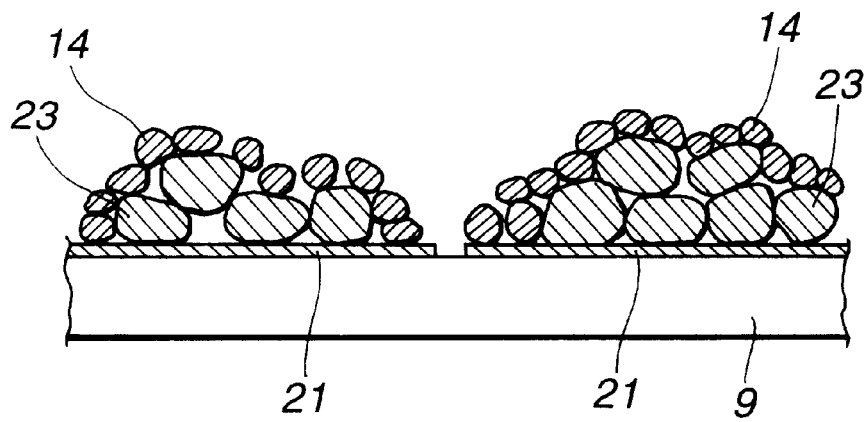
FIG. 7 is a fragmentary enlarged sectional view showing an anode incorporated in a second embodiment of a fluorescent luminous device according to the present invention.

Example 3 was carried on a second embodiment of a fluorescent luminous device according to the present invention shown in FIG. 7. Thus, first of all, a fluorescent luminous device of the second embodiment will be described with reference to FIG. 7. The fluorescent luminous device includes an anode substrate 9 on which anode conductors 21 are arranged in an island-like manner and so as to be spaced from each other at predetermined intervals. The anode conductors 21 each are formed thereon with a $(Y_{1-x}, Gd_x)_3Al_5O_{12}$:Ce (X=0.8) phosphor 23 which is a non-sulfide phosphor. Then, a ZnO:Zn phosphor 14 is deposited on the $(Y_{1-x}, Gd_x)_3Al_5O_{12}$:Ce phosphor. The ZnO:Zn phosphor 14 is arranged so as to cover a substantially whole surface of the $(Y_{1-x}, Gd_x)_3Al_5O_{12}$:Ce phosphor 23 and electrically contacted with the anode conductor 21. In FIG. 7, the phosphors 14 and 23 each are formed into a thickness corresponding to a diameter or height of one phosphor particle or a combined height of two phosphor particles. Actually, it is formed into a thickness corresponding to a height of 1.7 phosphor particles on an average. A cathode substrate (not shown) is arranged opposite to the anode substrate 9 and is formed thereon with FECs as in the first embodiment described above.

Figure 8:
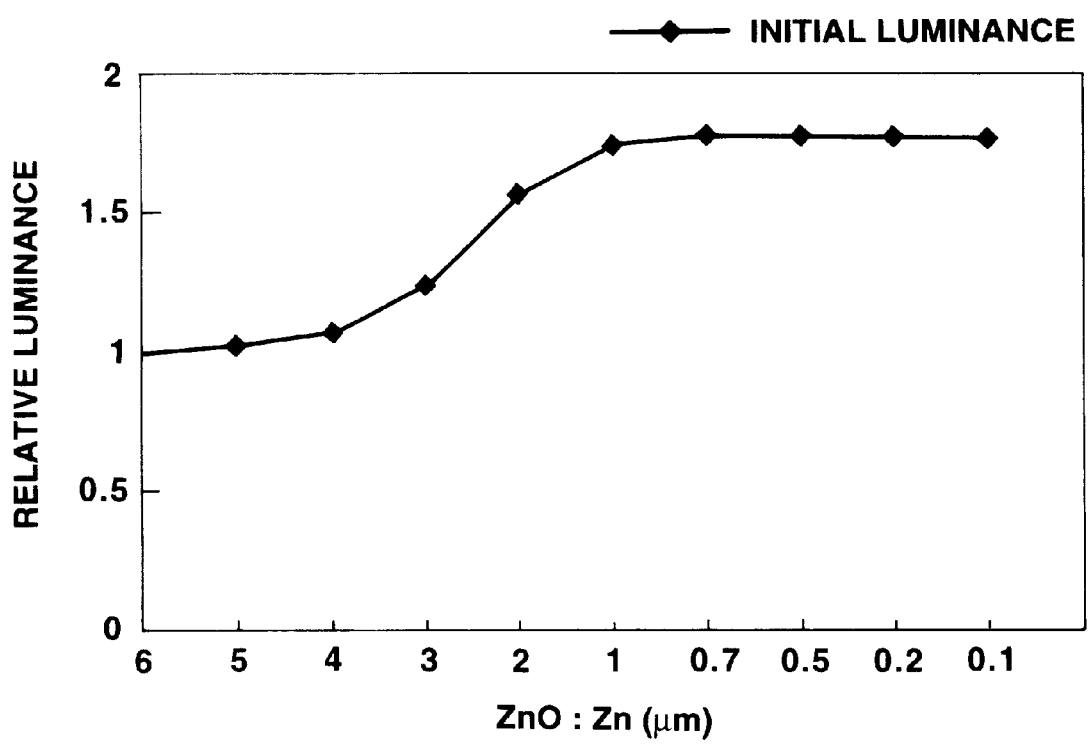
FIG. 8 is a graphical representation showing relationship between a particle diameter of a ZnO:Zn phosphor and relative luminance thereof in the fluorescent luminous device of FIG. 7.
Figure 9:
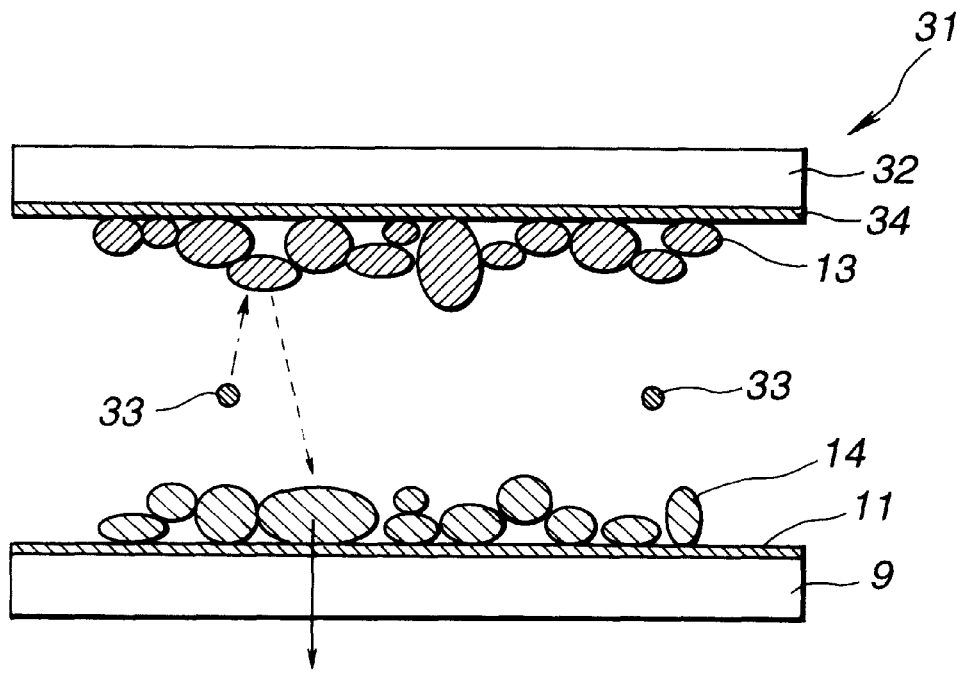
FIG. 9 is a schematic sectional view showing a third embodiment of a fluorescent luminous device according to the present invention.
Figure 10:
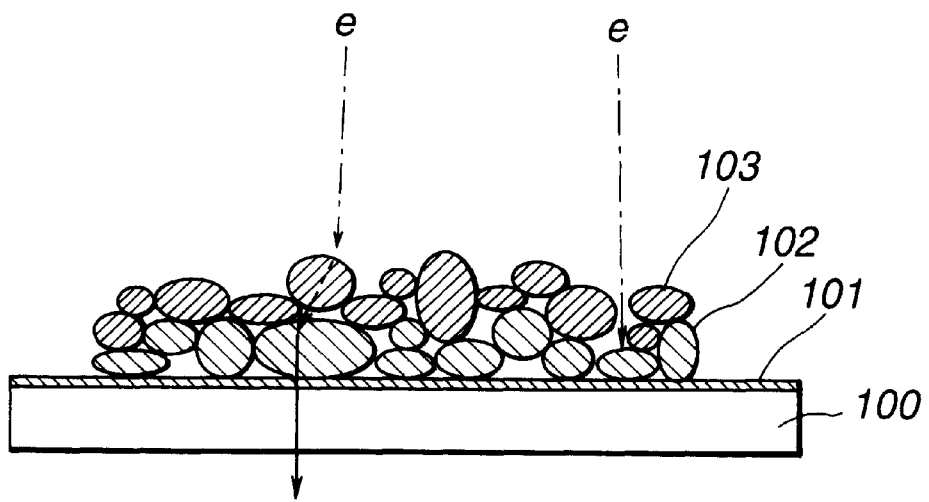
FIG. 10 is an enlarged sectional view showing an anode incorporated in a conventional fluorescent luminous device.

Example 3 was executed on the fluorescent luminous device thus constructed. In this example, the ZnO:Zn phosphor 14 was varied in particle diameter within a range between 6 μm and 0.1 μm while keeping an average particle diameter of the $(Y_{1-x}, Gd_x)_3Al_5O_{12}$:Ce phosphor 23 at 6 μm, to thereby provide a present device, which was then subject to evaluation of initial luminance. The results were as shown in FIG. 8, in which luminance of the device obtained when a particle diameter of the ZnO:Zn phosphor 14 is set to be 6 μm which is the same as that of the $(Y_{1-x}, Gd_x)_3Al_5O_{12}$:Ce phosphor 23 is supposed to be 1. FIG. 8 indicates that luminance of the device was gradually increased with a decrease in diameter of the ZnO:Zn phosphor 14. Such an advantage was remarkably exhibited when a particle size of the ZnO:Zn phosphor 14 was reduced below 2.5 μm. This corresponds to a point at which an average particle diameter of the ZnO:Zn phosphor 14 is reduced to about 0.4 or less supposing that an average particle diameter of the $(Y_{1-x}, Gd_x)_3Al_5O_{12}$:Ce phosphor 23 is 1. Further, relative luminance of the device was increased to a level beyond about 1.7 when a particle diameter of the ZnO:Zn phosphor 14 was reduced to less than 1 μm. This corresponds to a point at which an average particle diameter of the ZnO:Zn phosphor 14 is reduced to about 0.3 or less supposing that an average particle diameter of the $(Y_{1-x}, Gd_x)_3Al_5O_{12}$:Ce phosphor 23 is 1.

FIG. 8 indicates that luminance of the ZnO:Zn phosphor was reduced when an average particle size of the ZnO:Zn phosphor decreased to about 0.1 μm. It is generally said that an excessive decrease in particle diameter of a phosphor causes a deterioration in characteristics of the phosphor. The above-described reduction in luminance of the ZnO:Zn phosphor at the average particle diameter of about 0.1 μm in the example would be due to such a deterioration of efficiency of the ZnO:Zn phosphor.

EXAMPLE 4

Example 4 was executed on a VED including filamentary cathodes, unlike the above-described examples directed to the FED. More particularly, the example was directed to a third embodiment of a fluorescent luminous device according to the present invention shown in FIG. 9. A fluorescent luminous device of the illustrated embodiment is constructed into a VED and includes an anode substrate 9 which is formed on an inner surface thereof with abode conductors 11. The anode conductors 11 each have a ZnO:Zn phosphor 14 deposited thereon. Arranged opposite to the anode substrate 9 is a rear substrate 32, which is formed on an inner surface thereof with a conductor 34. The conductor 34 has a non-sulfide phosphor 13 deposited thereon, which is excited by only light emitted from the ZnO:Zn phosphor, to thereby emit light of a yellowish red luminous color. The non-sulfide phosphor 13 may be made as in the examples described above. Between the anode substrate 9 and the rear substrate 32 is arranged a side plate (not shown) in a manner to be positioned at an outer periphery thereof, through which both substrates are sealedly joined to each other, to thereby provide a box-like envelope. Reference numeral 33 designates filamentary cathodes arranged in the envelope so as to act as an electron source.

In Example 4 carried out using the fluorescent luminous device of the third embodiment thus constructed, application of an anode voltage to the anode conductor 11 permitted electrons emitted from the cathodes 33 to be impinged on the ZnO:Zn phosphor 14 while being attracted toward the anode conductor 11. The ZnO:Zn phosphor 14 exhibited luminescence at such an emission spectrum as shown in FIG. 4 or the like. Light emitted from the ZnO:Zn phosphor 14 was irradiated on the non-sulfide phosphor 13, leading to luminescence of the non-sulfide phosphor 13. This resulted in the non-sulfide phosphor 13 and ZnO:Zn phosphor 14 emitting light of a yellowish red luminous color and light of a bluish green luminous color, respectively, which were externally observed through the light-permeable anode substrate 9. Thus, the fluorescent luminous device provided by the example exhibited increased reliability in operation and an increased emission spectrum width or range while utilizing the non-sulfide phosphor emitting light of a yellowish red luminous color due to excitation thereof by luminescence of the ZnO:Zn phosphor.

As can be seen from the foregoing, the fluorescent luminous device of the present invention is so constructed that the phosphor layer is made of a non-sulfide phosphor excited by luminescence of the ZnO:Zn phosphor to emit light of a yellowish red luminous color.

Such construction of the present invention permits luminescence of a non-sulfide phosphor which is inherently deteriorated due to excitation thereof by electron beams to be effectively utilized.

Also, it permits the non-sulfide phosphor to supplement luminescence of the ZnO:Zn phosphor which inherently lacks a luminous component of a yellowish red color. Thus, use of a suitable filter contributes to an increase in applications of color display of the fluorescent luminous device.

Thus, the fluorescent luminous device of the present invention exhibits increased reliability while exhibiting a luminous component of a yellowish red color.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A fluorescent luminous device comprising:

an anode substrate made of a light-permeable material so as to constitute a part of an envelope;

electrodes made of a light-permeable material and formed on an inner surface of said anode substrate;

a phosphor formed on each of said electrodes, said phosphor being free from sulfide;

a ZnO:Zn phosphor deposited on said phosphor;

said phosphor being excited by luminescence of said ZnO:Zn phosphor to emit light of a yellowish red luminous color; and an electron source arranged in said envelope.

2. A fluorescent luminous device as defined in claim 1, wherein said phosphor contains a non-sulfide conductive material exhibiting light-permeability.

3. A fluorescent luminous device as defined in claim 2, wherein said conductive material is arranged so as to cover said phosphor in a film-like manner.

4. A fluorescent luminous device as defined in claim 2, wherein said conductive material is added to said phosphor.

5. A fluorescent luminous device as defined in claim 2, wherein said conductive material is at least one selected from the group consisting of ZnO, $In_2O_3$ and $SnO_2$.

6. A fluorescent luminous device as defined in claim 1, wherein said phosphor is $(Y_{1-x}, Gd_x)_3Al_5O_{12}$:Ce (X=0.4 to 0.9).

7. A fluorescent luminous device as defined in claim 1, wherein said phosphor is 3.5 MgO.0.5 $MgF_2/GeO_2$:Mn.

8. A fluorescent luminous device as defined in claim 1, wherein said ZnO:Zn phosphor has an average particle diameter of 0.4 or less supposing that an average particle diameter of said phosphor is 1.

9. A fluorescent luminous device as defined in claim 1, wherein said phosphor has an average particle diameter of 6 μm and said ZnO:Zn phosphor has an average particle diameter of 1 μm or less.

10. A fluorescent luminous device as defined in claim 1, wherein said phosphor emits light of a yellowish red luminous color having a wavelength between 550 nm and 700 nm.

11. A fluorescent luminous device as defined in claim 1, wherein said electron source is constituted by field emission cathodes.

* * * * *